United States Patent

Busking et al.

[11] Patent Number: 6,160,510
[45] Date of Patent: *Dec. 12, 2000

[54] DELAY LINE ANTENNA ARRAY SYSTEM AND METHOD THEREOF

[75] Inventors: Erik B. Busking, Den Haag; Richard D. J. van Nee, De Meern, both of Netherlands

[73] Assignee: Lucent Technologies, Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/887,856

[22] Filed: Jul. 3, 1997

[51] Int. Cl.[7] ............... H01Q 3/12; G01S 3/16; H04B 7/08

[52] U.S. Cl. ............. 342/374; 342/383; 455/133; 455/277.2

[58] Field of Search ................. 342/374, 375, 342/383, 380, 367, 442, 445, 432, 433, 437; 455/133, 135, 136, 137, 277.1, 277.2, 276.1, 273, 289, 138, 139, 134

[56] References Cited

U.S. PATENT DOCUMENTS

| | | | |
|---|---|---|---|
| 2,551,805 | 5/1951 | McDonald | 455/134 |
| 3,400,405 | 9/1968 | Patterson, Jr. | 342/374 |
| 3,987,444 | 10/1976 | Masak et al. | 342/380 |
| 4,063,250 | 12/1977 | Fenwick | 343/844 |
| 4,280,128 | 7/1981 | Masak . | |
| 4,298,873 | 11/1981 | Roberts | 342/375 |
| 4,334,316 | 6/1982 | Tanaka | 455/139 |
| 4,512,034 | 4/1985 | Greenstein et al. | 455/139 |
| 4,644,359 | 2/1987 | Katagi et al. | 342/379 |
| 4,752,941 | 6/1988 | Takahara et al. | 455/139 |
| 4,757,318 | 7/1988 | Pulsifer et al. | 342/375 |
| 4,888,493 | 12/1989 | Friedman et al. | 342/375 |
| 5,084,708 | 1/1992 | Champeau et al. | 342/377 |
| 5,390,357 | 2/1995 | Nobusawa et al. | 455/137 |
| 5,410,321 | 4/1995 | Gordon et al. | 342/374 |
| 5,422,908 | 6/1995 | Schilling . | |
| 5,475,875 | 12/1995 | Katsuyama et al. | 455/275 |
| 5,479,177 | 12/1995 | Rudish et al. | 342/375 |
| 5,493,306 | 2/1996 | Rudish et al. | 342/371 |
| 5,543,806 | 8/1996 | Wilkinson | 342/383 |
| 5,617,102 | 4/1997 | Prater | 342/374 |
| 5,659,572 | 8/1997 | Schilling | 342/380 |
| 5,848,361 | 12/1998 | Edwards | 455/562 |

FOREIGN PATENT DOCUMENTS

| | | | |
|---|---|---|---|
| 0 344 833 | 5/1989 | European Pat. Off. | H04B 7/02 |
| 0 344 833 A1 | 5/1989 | European Pat. Off. | H04B 7/02 |
| 0 416 264 A2 | 7/1990 | European Pat. Off. | H01Q 3/26 |
| 0344833 | 4/1993 | European Pat. Off. | H04B 7/02 |
| 0 704 984 A2 | 9/1995 | European Pat. Off. | H04B 1/16 |
| 0 709 974 A1 | 10/1995 | European Pat. Off. | H04B 7/08 |

OTHER PUBLICATIONS

European Search Report dated Sep. 25, 1998.

Patent Abstracts of Japan, vol. 005, No. 063 (E–054), Apr. 28, 1981 & JP 56 013805 A (Toshiba Corp; Others: 01), Feb. 10, 1981.

*Primary Examiner*—Gregory C. Issing

[57] ABSTRACT

An antenna array system combines the antenna signals from separate antennas using at least one delay in the RF path of an antenna. In certain embodiments, the antenna array system combines the antenna signals in the Radio Frequency (RF) domain before analog-to-digital (A/D) conversion, thereby reducing the amount of hardware required when compared to antenna array systems where the antenna signals are combined digitally. In doing so, signals from antennas are combined with signals from a plurality of antennas to determine if they improve signal quality. Only signals determined to improve signal quality are maintained as active. In accordance with other aspects, the antenna system selects parameter settings for the antenna array to provide enhanced performance.

27 Claims, 3 Drawing Sheets

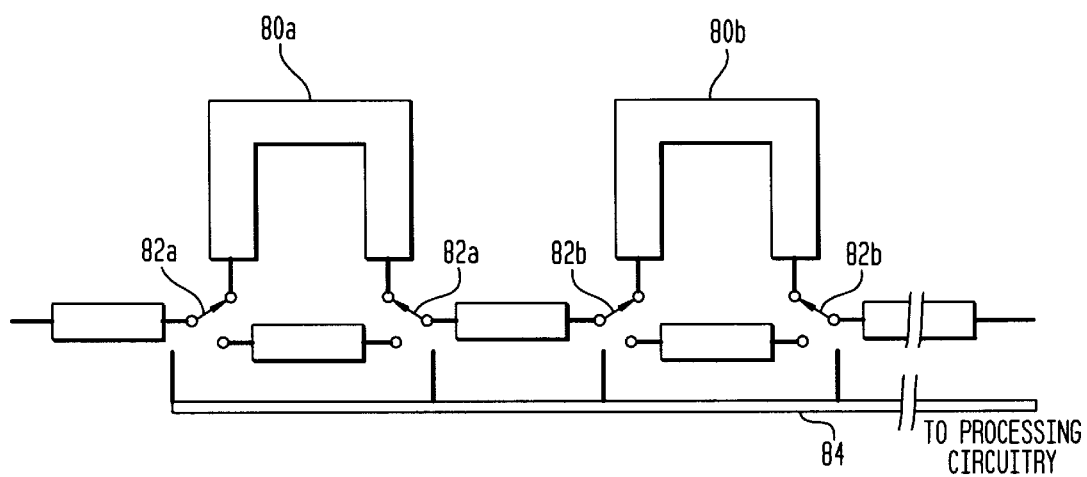

DELAY LINE ANTENNA ARRAY SYSTEM AND METHOD THEREOF

BACKGROUND OF THE INVENTION

1. Field of the Invention

The present invention relates to antenna arrays in general and, more particularly, to a delay line antenna array system.

2. Description of the Related Art

Antenna arrays have advantages over single, omnidirectional antennas due to three general characterisitics of antenna arrays. First, antenna arrays provide a signal-to-noise ratio (SNR) gain equal to the number of antennas. Second, antenna arrays can reduce multipath delay spread and fading fluctuations of the received signal because the antenna array can focus on the reception of one or more strong path signals with low relative delays while signals with large excess delays can be attenuated. Third, antenna arrays can separate signals from different users transmitting at the same frequency. These three characteristics for antenna arrays enhance the capacity of wireless, indoor and outdoor networks.

A disadvantage associated with antenna arrays is complexity. Multiple receivers are needed, one for each antenna, and existing methods of combining the different antenna signals are rather complicated and costly. For example, if the different antenna signals are combined digitally, analog-to digital converters are required for the different antennas. Accordingly, an antenna array system is needed which provides the advantages associated with antenna arrays while reducing the complexity and costs of current antenna array systems.

SUMMARY OF THE INVENTION

The present invention relates to an antenna array system which combines the antenna signals from separate antennas using at least one delay in the RF path of an antenna. In certain embodiments, the antenna array system combines the antenna signals in the Radio Frequency (RF) domain before analog-to-digital (A/D) conversion, thereby reducing the amount of hardware required when compared to antenna array systems where the antenna signals are combined digitally. In accordance with other aspects of the present invention, the antenna array system selects delay settings for the antenna array to provide enhanced performance.

BRIEF DESCRIPTION OF THE DRAWING

Other aspects and advantages of the present invention may become apparent upon reading the following detailed description and upon reference to the drawings in which:

FIG. 4 shows a particular embodiment of a variable delay as a cascade of switchable delay lines according to other principles of the present invention.

DETAILED DESCRIPTION

Illustrative embodiments of the antenna array system according to the principles of the present invention are described below as the antenna array system might be implemented to reduce costs and enhance performance of a wireless receiver.

Figure 1:
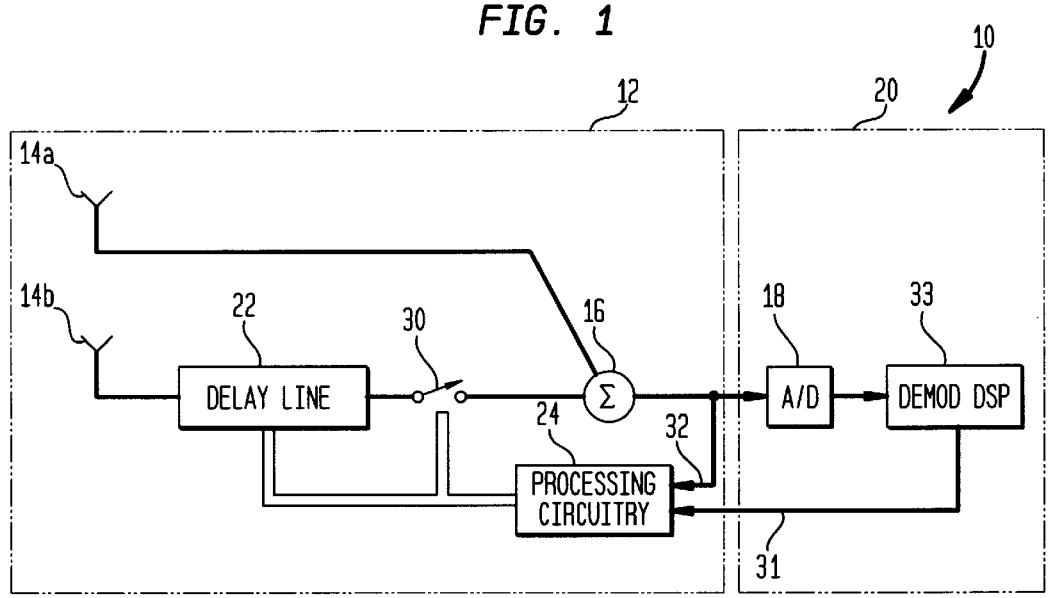
FIG. 1 depicts a general block diagram of a receiver using an embodiment of the antenna array system according to the principles of the present invention.

FIG. 1 shows a simple block diagram of a receiver 10 using a simple embodiment of the antenna array system 12 according to the principles of the present invention. The antenna array system 12 includes separate antennas 14a and 14b which have spatial separation and/or different polarizations. A combiner 16 combines the signals from the separate antennas 14a and b. In certain embodiments, the antenna signals are physically combined in the RF domain before analog-to-digital (A/D) conversion by an A/D converter 18 in the remainder 20 of the receiver 10. The antenna 14b is connected to a delay 22. The delay 22 can be set to a delay invoking a lagging phase rotation of the center frequency of the channel to be received. For example, in this particular embodiment, the delay 22 can be set to lagging phase rotations of 0, 90, 180 or 270 degrees. Alternatively, the delay 22 can be set to other phase rotations, and the differences between the phase rotations are not necessarily equal. Additionally, in this particular embodiment, a single delay 22 is shown in the path of the antenna 14b, but an additional delay is possible in the path of the antenna 14a.

The antenna array system 12 includes processing circuitry 24 which can include a microprocessor (not shown) running software, memory (not shown) and/or detection circuitry (not shown) according to aspects of the present invention. The processing circuitry 24 can alternatively be a portion of receiver control circuitry and/or a digital signal processor (DSP). Additionally, the processing circuitry can include an application specific integrated circuit(s) and/or various discrete components.

In this particular embodiment, the processing circuitry 24 sets a delay line 22 to rotate the center frequency of the channel to be received to zero (0) degrees. Upon reception of a transmitted signal in the receive channel, the processing circuitry 24 of this particular embodiment obtains signal quality information for the transmitted signal in the receive channel at 0 degrees and retains the result. In this particular embodiment, the processing circuitry 24 stores the result in a memory location 1. In this particular embodiment, the signal processing information is provided over line 31 from a demodulator 33 using a DSP. Depending on the application, the processing circuitry 24 can measure and determine signal quality information from the transmitted signal. The processing circuitry 24 can also receive and use signal quality information from the demodulator 33 without requiring additional calculation, or the processing circuitry 24 can receive signal quality information measured by other components and perform additional calculations and manipulation of the signal quality information to obtain the desired signal quality information. Signal quality information can include a power estimate from the Automatic Gain Control (not shown) and/or the Mean Square Error from the equalizer (not shown). Alternatively, line 32 can provide received voltage which in some applications can give sufficient information.

The processing circuitry 24 then sets the delay line 22 to rotate the center frequency of the channel to be received to −90 degrees. Upon receiving the transmitted signal in the receive channel, the processing circuitry 24 obtains the signal quality and stores the result in a memory location 2. Next, the processing circuitry 24 sets the delay line 22 to rotate the center frequency of the channel to be received to −180 degrees. Upon receiving the transmitted signal in the receive channel, the processing circuitry 24 obtains the signal quality of the received signal and stores the result in memory location 3. Finally, in this particular embodiment, the processing circuitry 24 sets the delay line 22 to rotate the center frequency of the channel to be received to −270 degrees. Upon receiving the transmitted signal in the receive channel, the processing circuitry 24 obtains the signal quality and stores the result in a memory location 4. In this particular embodiment, the processing circuitry 24 examines the contents of the above memory locations 1–4 and selects which delay line setting resulted in the desired signal quality with respect to the applied quality measure. The processing circuitry 24 sets the delay line 22 to the corresponding setting and proceeds in processing the remainder of the received signal in the channel to be received. Alternatively, the desired signal quality for an antenna path can be determined by using a variable storing the most desirable signal quality value and a variable storing the corresponding delay value for the path and replacing those values when a more desirable signal quality measurement for the antenna path is made.

FIG. 1 shows the signal path for the antenna 14b comprising the delay line 22 and a switch 30. The signal path for the antenna 14b is shown in FIG. 1 directly connected to the combiner 16. In certain embodiments, the processing circuitry 24 can disconnect the signal path for the antenna 14b using the switch 30. After which, the processing circuitry 24 determines the signal quality of the transmitted signal through the signal path of the antenna 14a only and stores the result in an extra memory location 5. As such, the processing circuitry 24 can examine the signal quality of the transmitted signal with only the antenna 14a in addition to the signal quality measurements for the various delay settings in the signal path of the antenna 14b. If the signal quality of the transmitted signal with only the antenna 14a is desired, the processing circuitry 24 can proceed in processing the remainder of the received signal with only the antenna 14a.

Figure 2:
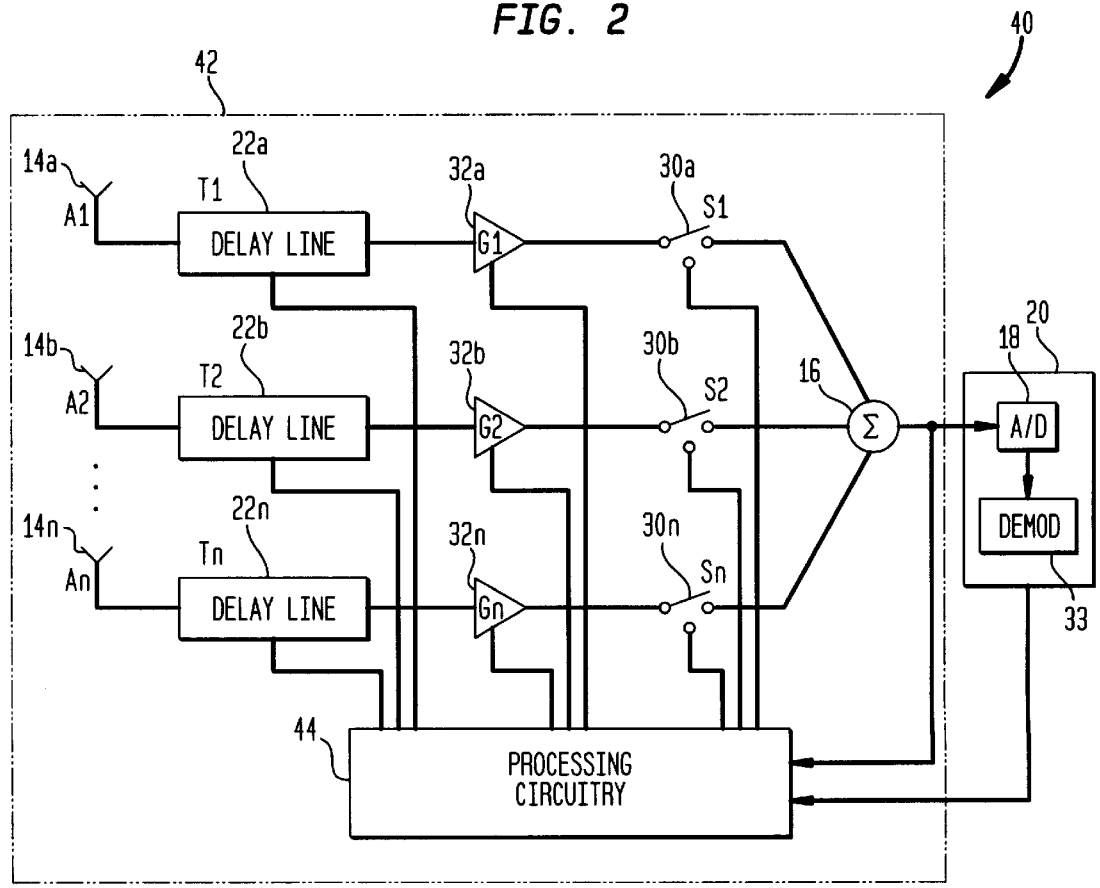
FIG. 2 depicts in block diagram form another embodiment of the antenna array system according to the principles of the present invention.

FIG. 2 shows a block diagram of an embodiment of a receiver 40 which uses more than two (2) antennas according to the principles of the present invention. This particular embodiment has n circuit paths where path i is the ith path for i=1 ... n Each path i has an antenna 14i ($A_i$), a delay line 22i ($D_i$), a switch 30. ($S_i$) and optionally a low noise amplifier 32a ($G_i$). The low noise amplifier 32a can be configured to replace the switch Si to turn the path i off and on. The delay line 22i, the switch 30i and the amplifier 32i can be cascaded in a different sequence. The outputs of all the paths i are summed by the combiner 16 and fed to the remainder 20 of the receiver 40. In this embodiment, the remainder 20 of the receiver 40 includes an analog-to-digital conversion of the output from the combiner 16.

In this particular embodiment, the switch 30a of the first path is always on, so the switch 30a can be removed. The delay line 22a ($D_1$) in this particular embodiment only provides a reference rotation $D_1$=0. Alternatively, different delay values or settings for the delay line 22a can be examined, and the path 1 of the antenna 14a can operate in the same manner as other paths i with minor changes in the described scheme. In this particular embodiment, each of the other delay lines 22b–n ($D_2$–$D_n$) are capable of decrementing the phase of the center frequency of the band in m discrete steps as controlled by processing circuitry 44. For each of the delay lines 22b–n ($D_2$–$D_n$), the processing circuitry 44 can decrement the phase of the center frequency from 0 to almost 360 degrees, i.e., $d_j$=[0, (1*360)/m, (2*360)/m, . . . ((m−1)*360)/m]. Although in this particular embodiment the decrements are equal, the phase decrements or shifts are not necessarily equal.

The processing circuitry 44 adjusts the delay values for the delays 22a–n for enhanced reception in an effective, efficient and simple manner according to the principles of the present invention. Initially, reception of the transmitted signal occurs using only the antenna 14a (path 1), and the processing circuitry 44 receives and/or determines the signal quality value for the transmitted signal and retains the signal quality value, for example, by storing the signal quality value in memory as a variable. Next, the processing circuitry 44 switches on the second antenna 14b (path 2) by sending a signal to the switch 30b ($S_2$). The path 2 starts with a phase zero delay ($d_1$), and in this particular embodiment, the processing circuitry 44 stores the signal quality for the received signal in another memory location for comparison with the other delay values $d_2$. . . $d_m$ in determining the best signal quality value for the path 2. The processing circuitry 44 then changes the delay value $d_j$ of the delay 22b in decremental steps and at each step in this particular embodiment, the processing circuitry 44 determines the signal quality for the received signal and compares the current signal quality value for the path 2 with the previous best signal quality value for the path 2. The processing circuitry 44 determines the best signal quality measure and corresponding delay for the path 2 and sets the delay 22b to the delay value $d_j$. Additionally, an overall best signal quality measure variable can be maintained throughout the procedure, and if a path i with any of its delays $d_j$ does not improve the overall best signal quality measure, the processing circuitry 44 can turn off that path i.

After the delay 22b for the path 2 is set, the processing circuitry 44 adds path 3 (if there is a path 3), and the delay 22c is set following the same procedure as described for the path 2. As such, as the paths i are being added, the processing circuitry 44 sets the delays i to the best delay settings or values $d_j$ for each path i in a sequential and cumulative manner. Alternatively, the processing circuitry 44 could determine and retain which paths provided the highest signal quality and set the corresponding delay lines 22i to the best delay settings $d_j$ found after all the paths have been examined.

Figure 3:
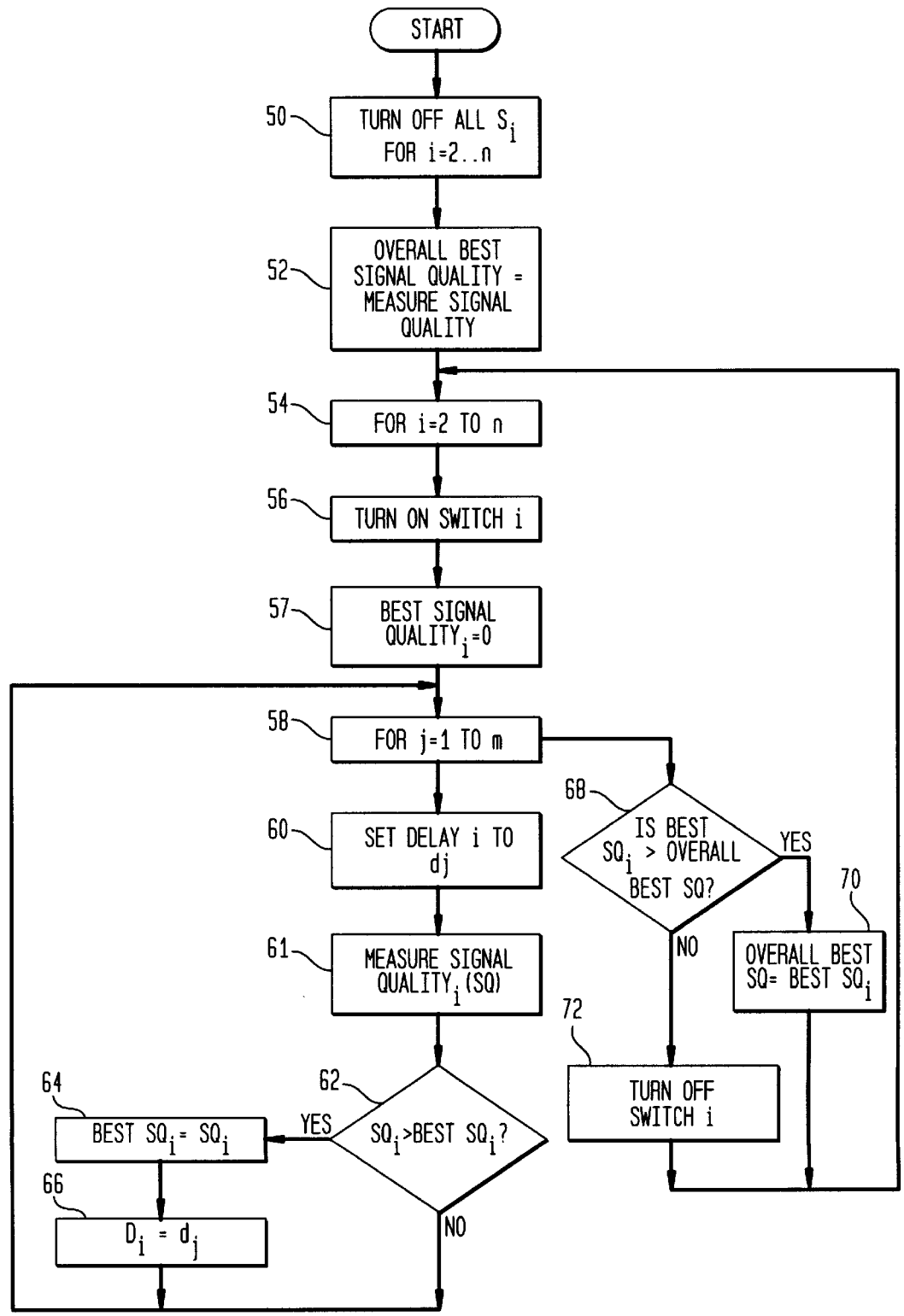
FIG. 3 depicts a flow chart showing an embodiment of the operation of the antenna array system according to certain principles of the present invention.

FIG. 3 shows a flow diagram of a particular embodiment of the operation of the antenna array system 42 (FIG. 2) according to certain principles of the present invention. In this particular embodiment, the processing circuitry 44 retains the best signal quality value and the corresponding best delay j for each path i. As the signal quality for the received signal is determined for each delay value $d_j$, the processing circuitry 44 sets the delay 22i to the delay value resulting in the best signal quality value for the path i. Initially, the processing circuitry 44 turns off the switches 20b–n ($S_2$–$S_n$) at step 50 and sets the delay 22a to an arbitrary delay value, such as zero (0) degrees. The receiver 40 receives the transmitted signal using only the antenna 14a (path 1), and the processing circuitry 44 determines the signal quality of the received signal and stores the signal quality measure as the initial overall best signal quality measure at step 52. Alternatively, the processing circuitry 44 could cycle through decremental delays for the delay 22a of the path 1, determine the signal qualities for the various delay values of the path 1, and maintain the delay value corresponding to the best signal quality measure for the path 1.

The processing circuitry 44 then establishes a loop 54 to cycle through the remaining paths 2 through n, and for each path i, the processing circuitry 44 in this particular embodiment determines the best signal quality for the received signals and the corresponding delay. If the signal quality for the received signal with the current path i and a current delay value $d_j$ is better than the best signal quality measure for the path i, the processing circuitry 44 replaces both the best signal quality measure for the path i with the improved signal quality value and the previous best delay value with the new delay value $d_j$. As shown, the block 54 starts with i=2, and the processing circuitry 44 adds the second antenna 14b (path 2) at step 56. Step 56 will sequentially add a new path i, and at step 57, the best signal quality for the new path i is initially set at 0 in this particular example. The processing circuitry 44 establishes another loop 58 from 1 to m for j to cycle through the decremental delays $d_j$ for each path i. At step 60, the delay for the path i is set to an initial delay value $d_j$. At step 61, the processing circuitry 44 measures the signal qualities of the received signals with the path i added having a delay value $d_j$ for the delay 22b.

At step 62, the processing circuitry 44 determines whether the current signal quality measure for the path i is greater than the previous best signal quality measure for the path i. If not, the processing circuitry proceeds to the block 58 to provide another phase delay value $d_j$ for the path i. If so, the processing circuitry 44 proceeds to step 64 to set the best signal quality value $D_1$ for the path i as the current signal quality measure which improves the current best signal quality for the received signal. The processing circuitry 44 sets the best delay value Di for the path i with the delay value corresponding to the best signal quality value for the path i at step 66. After the processing circuitry 44 has measured the signal quality of the received signal for all the delay values $d_j$ for the path i, the processing circuitry 44 determines at step 68 if the best signal quality of the path i has improved the overall best signal quality. If the best signal quality for the path i is greater than the current overall best signal quality, the processing circuitry 44 sets the overall signal quality to the best signal quality at step 70 because the path i with the delay 22i set to delay Di improves the overall signal quality. If the best signal quality for the path i does not improve the overall signal quality, the processing circuitry turns off the path i at step 72.

The processing circuitry then proceeds to block 54 to add the next path i. The next path i is examined in the same manner as the previous path. If all the paths i have been examined, the processing circuitry 44 will receive signals using the paths and the delay settings obtained through this particular embodiment. The processing circuitry 44 can maintain these delay settings until the receiver 40 (FIG. 2) determines that the procedure must be invoked again. Alternative control schemes are possible. For example, the processing circuitry 44 could use all the paths i and use the delay values resulting in the best signal quality values for each path i without turning off any paths i. Alternatively, the processing circuitry 44 can store all the signal quality measurements along with the corresponding stored values of path and delay and perform additional and/or continuous analysis of the signal quality measurements to reset the paths i and corresponding delays 22i. Additionally, the order in which paths i and/or delays $d_j$ for each path i are examined can be changed.

A pseudo-code procedure implementing a particular embodiment of the operation of the antenna array system according to the principles of the present invention can be written as follows:

```
BEGIN
    Turn Switch_i with i = 2 . . . n all off;
    (*to commence only with Path 1*)
    Overall Best Signal Quality = 0;
    Measure Signal Quality and store in memory with corresponding i
    and j value;
    (*in this case i=1,j=arbitrary*)
    FOR i=2 to n (*Successively adding Paths by closing Switch_i*)
    DO
    BEGIN
        Add Path_i.
        Best Signal Quality = 0;
        For j=1 to m (*delay line of Path_i is switched stepwise*)
        DO
        BEGIN
            Set delay of path i to j
            Measure Signal Quality and store in memory with cor-
            responding i and j values;
            IF Signal Quality > Best Signal Quality
            THEN
            BEGIN
                Best Signal Quality := Signal Quality;
                Best Delay = j; (*The i-th path gets delay setting j*)
            END;
        END;
        Set delay of path i to Best Delay
        if Best Signal Quality > Overall Best Signal Quality,
            Overall Best Signal Quality = Best Signal Quality;
        else turn off switch i
    END;
END.
```

FIG. 4 shows a particular embodiment of a delay line 22 (FIG. 1, FIG. 2) which can be used in particular embodiments according to the principles of the present invention. The delay line 22i includes (micro) stripline elements 80a and 80b and corresponding switches 82a and 82b. The processing circuitry 44 (FIG. 2) sends control signals over line 84 to control the different switches 82a and b. By controlling the switches 82a and b, the processing circuitry 44 can change the delay value $d_j$ for the variable delay 22i in steps according to the principles of the present invention. For example, the processing circuitry 44 could start examining the various delay values $d_j$ for the path i with the switches 82a and 82b in the bottom position for the smallest delay. The processing circuitry 44 could change the delay value $d_j$ for the delay 22i by switching the switches 82a to the top position to introduce the delay value associated with the stripline element 80a. To increase the delay value $d_j$ even further, the processing circuitry 44 could switch the switches 82b to the top position to introduce the delay of the stripline element 80b. In this particular embodiment, only two stripline elements 80a and 80b are shown, but additional stripline elements can be added to increase the amount of delay and/or to increase the resolution between the different delay values for the delay 22i. Additionally, the stripline elements could be different, thereby introducing differing amounts of delay. Finally, the delay $d_j$ for the delay line 22i could be such that the corresponding phase rotation exceeds 360 degrees.

Accordingly, the present invention provides an antenna array system for a wireless receiver that provides enhanced performance with a relatively simple solution. The antenna array system according to the principles of the present invention provides quick and efficient enhancement of signal reception by using an antenna array with at least one antenna path having a delay. The delay value of the delay can be varied, and the delay value resulting in a desirable signal quality as measured by a signal quality measurement(s) is maintained. In accordance with certain aspects of the present invention, the antenna array system provides enhanced performance in a relatively short training time by starting with one antenna (path 1), adding a second antenna (path 2), varying the delay value associated with the second antenna to find a delay configuration which provides the relative best signal quality for the received signal. In certain embodiments, a third antenna (path 3) or more is added in this sequential manner, and the delay values are varied according to the principles of the present invention to find a new delay configuration resulting in a new relatively best signal quality for the received signal.

Certain embodiments of the antenna array system according to the principles of the present invention continue determining delay configurations resulting in better signal quality until all antennas and their associated delays are connected and/or have been examined. Other embodiments can stop determining delay configurations resulting in better signal qualities once a desired signal quality is achieved. Especially in the case of a two antenna array, the delay configuration resulting in enhanced signal reception is realized very quickly which is very important in novice wireless applications in which the training time has to be designed as short as possible. Thus, the antenna array system according to the principles of the present invention provides enhanced receiver performance and the advantages of antenna arrays without the costs or drawbacks associated with current antenna arrays.

Alternative configurations of the antenna array system according to the principles of the present invention are possible which omit or add components, use different schemes, use different delays and/or different delay steps, and/or perform variations of the above-described antenna array system and control thereof. For example, the delay lines 22i (FIG. 2) could be chosen to have particular delay ratios, such as 1:2:4. . . . This binary configuration enables n control lines from the processing circuitry 44 (FIG. 2) to set 2" delays. Other alternative embodiments can be used which are encompassed by the principles of the present invention to provide rapid enhancing of signal reception by using an antenna array of at least two antennas with at least one variable delay and summing the signals from the two paths after the variable delay.

The antenna array system has been described as being comprised several simple components, but it should be understood that the antenna array system and portions thereof can be employed using other forms of delays, switching arrangements, and processing circuitry and variations in the antenna array system and control configuration. For example, the processing circuitry or portions thereof could be employed in existing processing circuitry such as the receiver control processor or digital signal processor. Additionally, the antenna array system according to the principles of the present invention can be implemented utilizing various combinations of application specific integrated circuits, software driven processing circuitry, and/or other arrangements of discrete components. What has been described is merely illustrative of the application of the principles of the present invention. Those skilled in the art will readily recognize that these and various other modifications, arrangements and methods can be made to the present invention without strictly following the exemplary applications illustrated and described herein and without departing from the spirit and scope of the present invention.

The invention claimed is:

1. An antenna array system, said system comprising:
a first antenna receives communication signals and corresponds to a first path for said communication signals;
a second antenna receives communication signals and corresponds to a second path for said communication signals, said second path having a delay for said communication signals;
a switch is connected in said second path which turns said second path off and on;
a combiner coupled to said first path and said second path, receives said communication signals from said first path and said second path when said switch is on and combines said communication signals from both said first and second paths when said switch is on to produce a composite communication signal; and
processing circuitry measures said communication signals from said first path when said switch is off and measures at least one composite communication signal when said switch is on to determine if said switch on said second path is to be turned off, wherein the composite communication signal is compared to the communication signal from said first path and said processing circuitry determines whether said switch should be turned off or kept on based upon said comparison.

2. The antenna array system of claim 1 wherein said combiner combines said communication signals from said first and second paths in the Radio Frequency (RF) domain before analog-to-digital (A/D) conversion.

3. The antenna array system of claim 2 wherein said delay is a variable delay, said processing circuitry being configured to change the delay of said variable delay in said second path, and said processing circuitry being configured to measure a composite communication signal for different delays associated with said variable delay and being configured to determine whether said switch is to be turned off based upon comparisons of the composite communication signal for different delays and the communication signal from said first path.

4. The antenna array system of claim 3 wherein said delay is configured as a controllable delay line constructed of a cascade of switchable delay lines to provide variable delays.

5. The antenna array system of claim 1 wherein a low noise amplifier is configured to act as the switch and turn said second path off and on.

6. The antenna array system of claim 1 wherein a low noise amplifier is connected in said second path.

7. The antenna array system of claim 1 wherein said first path includes a delay.

8. The antenna array system of claim 1, wherein said processing circuitry controls said switch to be turned on subsequent to receiving the communication signal from said first path, controls the switch to be left on upon said composite communication signal being of a relatively higher quality than said communication signal from said first path, and controls the switch to be turned off upon said composite communication signal being of a relatively lower quality than said communication signal from said first path.

9. The antenna array system of claim 1, further comprising:
a third antenna receives communication signals and corresponds to a third path for said communication signals; and
a second switch connected in said third path which turns said third path off and on,
wherein said combiner is coupled to said first path, said second path and said third path, receives and combines signals from said first path and said second and third paths when said respective switch and second switch are on to produce a composite communication signal, and wherein said processing circuitry measures and compares either a composite communication signal including signals from said first, second, and third paths to a composite communication signal including signals from said first and second paths, if the switch connected in said second path is determined to be kept on, or measures and compares a communication signal from said first path to a composite communication signal including signals from said first and third paths, if the switch connected in said second path is determined to be turned off, to determine whether said second switch should be turned off or kept on based on the comparison mode.

10. An antenna array system of claim 1, wherein said processing circuitry is configured to vary a delay value of said delay, configured to measure signal quality of said composite communication signal for each of said varied delay values, and configured to adjust said delay to a delay value producing said composite communication signal of a relatively higher signal quality.

11. An antenna array system of claim 10, further comprising:
a memory, adapted to receive and store composite communication signals for each of the varied delay values.

12. An antenna array system of claim 11, wherein said memory is further adapted to store each of the varied delay values in association with corresponding composite communication signals.

13. The antenna array system of claim 12, wherein said processing to circuitry is configured to compare signal quality of the stored composite communication signals and adjust the delay to a delay value stored in association with the composite communication signal of relatively highest signal quality.

14. An antenna array system, said system comprising:
a plurality of antennas receiving communication signals, each antenna corresponds to a separate path for said communication signals;
a delay in at least one of the separate paths;
a switch connected to said at least one of said separate paths, said switch turns said at least one of said separate paths off and on;
a combiner coupled to said at least one of said separate paths, configured to receive said communication signals from said at least one of said separate paths having said switch on and configured to combine said communication signals from said at least one of said separate paths having said switch on and communication signals from another of said separate paths to produce a composite communication signal; and
processing circuitry configured to compare a signal quality of said composite communication signal when said switch is on to a signal quality for a communication signal when said switch is off, and to determine whether said switch is to be turned off or on based upon the comparison.

15. The antenna array system of claim 14 wherein a plurality of said separate paths each have delays and a switch, each said switch turns one of said plurality of said separate paths off and on, said processing circuitry being further configured to turn on a switch for a current path and to compare a signal quality for said composite signal when said switch for said current path is on to a signal quality for said composite signal when said switch is off to determine whether said switch is to be turned off based upon the comparison.

16. The antenna array system of claim 15 wherein said delays are variable delays and said processing circuitry being configured to change the respective delay values associated with said delays.

17. The antenna array system of claim 6 wherein said processing circuitry is configured to determine signal qualities for said composite communication signal when said switch of said current path is on and, for a plurality of changed delay values for said delay on said current path, to determine whether said signal quality for each of said plurality of said composite communication signals is relatively improved from the communication signal when said switch for said current path is off.

18. The antenna array system of claim 15 wherein each of said variable delays is constructed as a cascade of switchable delay lines.

19. The antenna array system of claim 15, wherein the processing circuitry determines that the switch is to be turned off when the signal quality of the composite communication signal when the switch is turned on, is relatively lower than the signal quality of the composite communication signal when the switch is turned off.

20. The antenna array system of claim 14, wherein the processing circuitry determines that the switch is to be turned off when the signal quality of the composite communication signal when the switch is turned on, is relatively lower than the signal quality of the composite communication signal when the switch is turned off.

21. The antenna array system of claim 14, wherein the communication signal, when the switch is off, is a second composite communication signal, such that the processing circuitry compares a first composite communication signal when the switch is on to a second composite communication signal when the switch is off.

22. The antenna array system of claim 21, wherein each of the first and second composite communication signals are composites of at least two received signals.

23. A method of receiving communication signals, said method comprising the steps of:
receiving communication signals on a plurality of separate antennas with each antenna corresponding to a separate path for said communication signals;
measuring communication signals from at least two separate paths;
applying a delay value to one of said separate paths;
activating said one of said separate paths;
combining said communication signals on said one of said separate paths when said one path is activated with said communication signals from another of said at least two separate paths to produce a current composite signal; and
determining whether said one path is to be maintained as active or deactivated based on a comparison of measurements of relative signal quality between said current composite signal and said communication signals from said another of said at least two separate paths.

24. The method of claim 23 further including the steps of:
varying a delay value for said delay on said one of said separate paths;
selecting a delay value for said one of said separate paths that provides relatively improved signal quality for said combined communications signal as compared to said communications signal from said another of said at least two separate paths; and
maintaining said selected delay value for said one of said separate paths.

25. The method of claim 23 wherein said step of determining includes the steps of:
  using a variable delay to vary said delay value on said one of said separate paths to introduce different delay values on said one of said separate paths;
  measuring said signal quality of said current composite signal for each of said different delay values on said one of said separate paths; and
  comparing the relative signal quality for said current composite signal using each of said different delay values on said at least one of said paths with the signal quality of a previous composite signal and maintaining the delay value producing the relatively highest signal quality.

26. The method of claim 23, wherein communication signals from at least three of the plurality of separate paths is measured, a delay value is applied to at least two paths, the at least two paths are separately activated, communication signals of each of the two paths is combined with that of another, and a determination is made as to whether each of the two paths is to be deactivated or maintained as active.

27. The method of claim 23, wherein said determining step includes a comparison of measurements of relative signal quality between said current composite signal and another composite signal, wherein said another composite signal includes communication signals from said another path quality.

* * * * *